(12) United States Patent
Islam et al.

(10) Patent No.: US 11,418,608 B2
(45) Date of Patent: *Aug. 16, 2022

(54) SERVICE PROVIDER MANAGED APPLICATIONS IN SECURED NETWORKS

(71) Applicants: Atlassian Pty Ltd., Sydney (AU); Atlassian Inc., San Francisco, CA (US)

(72) Inventors: Zakiul Islam, Sydney (AU); Noah Wasmer, Sydney (AU)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/386,391

(22) Filed: Jul. 27, 2021

(65) Prior Publication Data
US 2021/0360075 A1    Nov. 18, 2021

Related U.S. Application Data

(63) Continuation of application No. 16/943,376, filed on Jul. 30, 2020, now Pat. No. 11,089,119.
(Continued)

(51) Int. Cl.
*G06F 15/16* (2006.01)
*H04L 67/51* (2022.01)
(Continued)

(52) U.S. Cl.
CPC .......... *H04L 67/16* (2013.01); *H04L 63/0428* (2013.01); *H04L 63/101* (2013.01); *H04L 67/1002* (2013.01); *H04L 67/20* (2013.01)

(58) Field of Classification Search
CPC ... H04L 67/16; H04L 63/0428; H04L 63/101; H04L 67/20
See application file for complete search history.

(56) References Cited

U.S. PATENT DOCUMENTS 9,015,824 B1    4/2015 Drewry et al.
10,171,590 B2 *  1/2019 Sama ................. H04L 63/0281
(Continued)

*Primary Examiner* — Johnny B Aguiar
(74) *Attorney, Agent, or Firm* — Brownstein Hyatt Farber Schreck, LLP

(57) ABSTRACT

Systems and methods for providing application services to a customer are provided. Customer-managed computing resources on a customer network may facilitate the provision of application services to a client device coupled to the customer network. Application instances providing the application services may execute either on the customer-managed computing resources or on computing resources managed by the service provider. Application services may be rendered to the customer while sensitive customer data maintains residency on storage resources on the customer network. Application instances may receive requests for services from the customer, and generate corresponding requests for particular data of the sensitive customer data. These requests may be conveyed to the endpoints on customer network capable of fulfilling the requests. Customer-managed computing resources and service provider-managed computing resources may be respective first and second subsets of a pool of shared computing resources, implemented as virtual private clouds (VPCs) accessible over respective private networks.

19 Claims, 5 Drawing Sheets

Related U.S. Application Data

(60) Provisional application No. 63/003,095, filed on Mar. 31, 2020.

(51) Int. Cl.
*H04L 9/40* (2022.01)
*H04L 67/1001* (2022.01)
*H04L 67/53* (2022.01)

(56) References Cited

U.S. PATENT DOCUMENTS

| | | | |
|---|---|---|---|
| 10,212,161 B1* | 2/2019 | Schaefer | H04W 12/08 |
| 10,257,263 B1* | 4/2019 | Wagner | H04L 12/66 |
| 10,880,312 B1* | 12/2020 | Mesard | H04L 63/102 |
| 2007/0289000 A1 | 12/2007 | Weiss et al. | |
| 2018/0083872 A1* | 3/2018 | Miller | H04L 63/101 |
| 2019/0289014 A1* | 9/2019 | Von Spreti | H04L 63/0272 |
| 2019/0357050 A1 | 11/2019 | Kennedy-Foster et al. | |
| 2020/0358651 A1 | 11/2020 | Brandwine et al. | |

* cited by examiner

SERVICE PROVIDER MANAGED APPLICATIONS IN SECURED NETWORKS

CROSS REFERENCE TO RELATED APPLICATION(S)

This is a continuation patent application of U.S. patent application Ser. No. 16/943,376, filed Jul. 30, 2020 and titled "Service Provider Managed Applications in Secured Networks," which is a nonprovisional patent application of and claims the benefit of U.S. Provisional Patent Application No. 63/003,095, filed Mar. 31, 2020 and titled "Service Provider Managed Applications in Secured Networks," the disclosures of which are hereby incorporated herein by reference in their entireties.

FIELD

One technical field of the present disclosure is computer data security in networked data storage. Another technical field is distributed computer systems architecture, including computer systems architected to provide applications managed by a service provider within a secure network that is managed by an entity that is different than the service provider.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Electronic data including computer program source code under development is a valuable asset for many companies, other entities and computer users. Due to security concerns, companies may implement access and security controls within a network or domain that is managed by the company in order to restrict and control access to their electronic data.

Modern computing architectures have enabled service providers to leverage web services to offer "software as a service" (SaaS). Using SaaS, a party that an application service provider services, such as a customer or other entity, connects to the hosted applications via a web browser or other web client, and enter or access data via the applications. Each different party or customer interacting with the application service provider is considered a "tenant" having data that is commingled in a multi-tenant data storage system that is subject to security controls that prevent one tenant from accessing or using data of another tenant. One example is source code management systems, which track and manage source code as it is written and revised. A source code management system may store and manage source code for multiple tenants, and each tenant only has access to its own source code.

However, customers may be wary of using SaaS applications because of potential data vulnerabilities in having multiple tenants access the same application instance. Additionally, customers may not wish to give the service provider responsibility for security management and access control of their digital data. Thus, for customers who require highly secure protection protocols for their digital data, SaaS solutions that do not keep customer data within a customer-managed domain may present unacceptable data vulnerabilities.

Techniques are desired for providing service provider applications that can securely interact with or manage data of another entity.

SUMMARY

The appended claims may serve as a summary of the invention.

Figure 1:
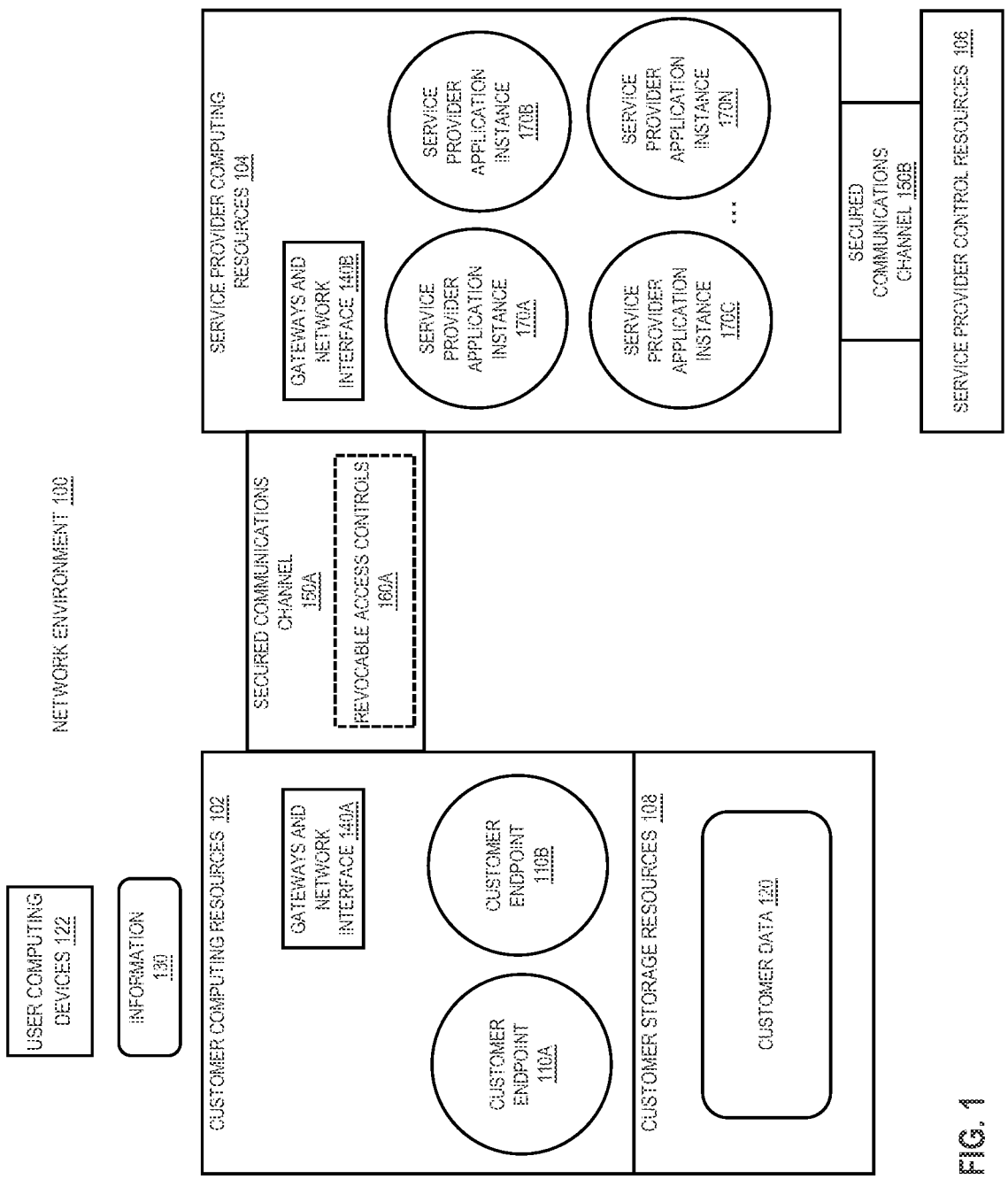
FIG. 1 illustrates an example network environment in which aspects of the present disclosure may be implemented.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 GENERAL OVERVIEW

In this disclosure, to illustrate clear examples and for convenience, certain paragraphs refer to entities as "customers". The term "customer" is intended broadly to refer to any unit, domain, network, organization or entity that is different from a service provider based upon legal organization, control, operations, geographical or physical location, or other factors, and any such entity is not required to have a customer relationship to the service provider. Thus, a customer is one example of such an entity, but not the only example.

Generally, techniques are described herein for providing service provider managed application instances within computing resources that another entity manages. For example, service provider application instances may access customer-managed data sources that may not be accessible to applications and/or computing resources that are external to the customer.

In the description below, reference is made to single-tenant service provider application instances. Cloud computing architectures permit a single SaaS application instance to be provided to one or more customers. When a single customer is the only customer who accesses and interacts with the SaaS application instance, then the SaaS application instance may be referred to as a "single-tenant" application instance. In contrast, a "multi-tenant" SaaS application instance is accessed by and processes data for a plurality of customers.

A managed software application instance, whether single-tenant or multi-tenant, may refer to a software application instance that receives administrative controls and updates or management controls. In some embodiments, these administrative controls and updates may be received from an external source. As an example, a managed service provider application instance may be monitored by an external control resource that is controlled solely by the service provider. The external control resource may monitor an application instance and periodically provide administrative controls or commands such as a "stop" command, a "restart" command, and/or a "fail-over" command in response to monitored conditions. For example, the external control resource may monitor the health of an application instance and in response to detecting operational issues with the application instance, issue commands to migrate any pending operations of the application instance to a redundant or second application instance before halting the application instance. The external control resource may also check for updates to the application instance and provide available updates to the application instance.

Computing resources, when referred to as being "managed," may reside within the network of, and/or be exclusively controlled or otherwise utilized by, the "manager" of said computing resources. As an example, customer-managed computing resources may reside within a network or domain of the customer and/or may be exclusively controlled by the customer. Similarly, computing resources that are managed by a service provider may reside within a network or domain of the service provider and/or may be exclusively controlled by the service provider.

In some embodiments, in response to the progression of automatic processes within the service provider application instance, user interactions with the service provider application instance, or user requests to a service provider application instance, a service provider application instance may require access to the contents of customer data. The customer data may be stored in data storage devices or systems that reside within the customer network or domain, and/or that are accessible only to computing resources that reside within the customer network or domain.

In some embodiments, the service provider application instance is executing on computing resources managed by the service provider. The service provider application instance may send requests for the customer data to customer-managed computing resources which process the requests, retrieve or receive the requested customer data, and provide the requested customer data to the service provider application instance. In an embodiment, the service provider application instance sends the requests over a secured communications channel. Additionally or alternatively, the requests may be routed through transit computing resources managed by the customer that validate and forward the requests to customer-managed computing resources that retrieve the customer data.

In other embodiments, the service provider application instance may execute on customer-managed computing resources. Access to the sensitive customer data by the service provider application instance may be direct in the sense that it is accessed via computing resources that are on the same domain or network as the customer data. This eliminates the need for inter-domain or inter-network peering between service provider-managed computing resources and customer-managed computing resources. However, access to the customer data by the application instance may still be indirect in the sense that the application instance may be monitored and controlled by the customer and its access privileges revoked when desired by the customer. As the application instance is executing on customer-managed computing resources, data flow to and from the application instance may be monitored and selectively regulated or gated by the customer.

In some embodiments, access to the customer data may be restricted to one or more customer-managed endpoints of the customer-managed computing resources. Before fulfilling any requests for the sensitive customer data from the service provider application instance, the one or more customer-managed endpoints may verify the request. The request may be verified, for example, by assessing the validity of access credentials or access credential information possessed by the requestor, consultation of an access control list (ACL), or the use of other revocable access means such as asymmetric cryptographic schemes implemented in the peering mechanism or the secured communications channel used to route communications between the customer-managed resources and the service provider computing resources.

Upon determining that the request is valid, a customer-managed endpoint may fulfill the request for customer data from the service provider application instance, and cause the requested data to be provided to the application instance. Upon receiving the requested customer data from the customer-managed computing resources, the service provider application instance may complete the processing of the initially-received customer request.

Additionally or alternatively, the customer data provided to the service provider application instance may be encrypted or otherwise secured. The service provider application instance may be configured with access credentials, public keys, or other information for accessing and/or decrypting the customer data. The customer may manage the validity of the access credentials, public keys, and other security information, which provides the customer another layer of security and control to the customer data. These features may generally be referred to as a customer-revocable access gate on communications.

In aspects of the present disclosure, processing of customer interactions and other application functions are performed by the service provider application, while sensitive customer data used by the service provider application resides within a customer domain or network on customer-managed computing resources. By remaining within a customer-managed domain, sensitive customer data is stored and maintained with security and access management controls that are managed by the customer, rather than the service provider or a third-party. As a result, customer data is not directly accessible by computing resources external to the customer, such as computing resources managed by the service provider, and is not accessible outside of users or clients who are authorized to do so by the customer. Instead, access to customer data is gated by and through the customer and customer-managed computing resources, and the customer holds revocable controls for access and security parameters associated with its data.

Thus, a benefit of the techniques described herein is that service provider application instances may process user requests that require usage of customer data without requiring co-location with, direct access to, or ownership of, the customer data by the service provider application instance or service provider computing resources. Similarly, service provider application instances may execute on different computing resources than the customer-managed endpoints through which customer data is directly accessible, and can proceed with application functions and processing user requests without assuming or requiring ownership of the customer data.

Examples are described herein where sensitive customer data includes source code that is developed and pushed to a source code management (SCM) system. However, customer source code is not the only sensitive customer data that may be resident at customer-managed computing and storage resources. Sensitive customer data, in the context of the present disclosure, can include any customer data that resides on or within customer-managed computing or storage resources during execution of a service provider application instance. Similarly, an SCM system is not the only type of service provider application that can interact with and/or process sensitive customer data. Other types of customer data and service provider applications may be used, depending on the embodiment, and the present techniques are not limited to any particular type of data or any particular type of applications.

2.0 NETWORK ENVIRONMENT OVERVIEW

FIG. 1 illustrates an example network environment 100 in which aspects of the present disclosure may be implemented. In FIG. 1, network environment 100 includes service provider computing resources 104, service provider control resources 106, customer computing resources 102, customer storage resources 108, and one or more user computing devices 122.

A user computing device 122 may be any computing device, including but not limited to: servers, racks, workstations, personal computers, general purpose computers, laptops, Internet appliances, wireless devices, wired devices, multi-processor systems, mini-computers, and the like. In some embodiments, user computing devices 122 may be configured with access to a customer network, subnetwork ("subnet"), or domain and/or may be configured to interact with customer computing resources 102. For example, the one or more user computing devices 122 may transmit information 130 to and receive information 130 from customer computing resources 102.

Client computing devices 122 may execute a command line interface, a graphic user interface, a REST endpoint, a web browser, or other software or applications to interact with service provider applications. The interface may be configured or programmed to generate information based on user input; send the information and/or requests or commands to the service provider applications; and receive or view results generated by the service provider applications. For example, in the case of a source code management system, a user may view or modify source code from a graphical user interface, and issue commands to commit or push changes to the source code, pull previous versions of source code, etc.

As discussed in further detail below, one or more instances of a service provider application may be executing on service provider computing resources within a service provider network, while the client computing devices 122 have access to or reside within a customer network. The interaction between the client computing devices 122 and the service provider application instances may be facilitated by customer computing resources within the customer network, such as by routing requests and information between the client computing devices 122 and the service provider computing resources.

In an embodiment, the service provider computing resources 104 and the service provider control resources 106 may be managed by a service provider, while the customer computing resources and the customer storage resources 108 may be managed by a customer of the service provider.

As referred to herein, computing resources may refer to a set of computing resources that have been allocated, provisioned, or otherwise designated to perform computing functions for a particular manager of said subset of the shared pool of computing resources. In some embodiments, the various embodiments discussed herein may execute on computing resources provisioned from a shared pool of computing resources. As an example, customer-managed computing resources 102 may refer to a subset of public computing and storage resources that are provisioned for use by the customer according a private networking scheme; an example is a private IP subnet and associated VLAN for addressing and accessing the resources.

In some embodiments, the computing resources 102 and 104 each comprise a plurality of clustered computing instances. The clustered computing instances may be interconnected via any suitable data network or communication mechanism including one or more LANs, one or more WANs, one or more internetworks, and the Internet. In an embodiment, the clustered computing instances are cloud computing instances such as EC2 instances, Compute Engine instances, or Azure instances, for example.

In the context of cloud computing, public cloud computing resources that are allocated to a manager, such as a customer or a service provider, may be leveraged along with the use of virtual private networks (VPNs) that allow the logical isolation of a subset of private computing resources from the shared common pool of public computing resources. A managed virtual private cloud (VPC) may refer to a subset of a shared pool of computing resources that is provisioned or logically isolated for use solely by a manager of the VPC. As an example, a customer-managed VPC may refer to a subset of a shared pool computing resources that are logically isolated from other resources in the shared pool, solely to be accessed and utilized by the customer. The computing resources that can be provisioned or accessed through a VPC may be computing resources or storage resources that belong to respective larger pools of public computing resources or public storage resources. Various resources that are provisioned to a given manager of the VPC may be addressed and accessible via a private addressing scheme, such as an internet-protocol subnet defined for the customer, and a virtual communication construct between the various resources addressed using the private scheme. For example, a virtual local access network can facilitate communications between storage or computing resources accessible and addressed by a private IP subnet defined for and managed by the customer.

In an embodiment, customer computing resources 102 may be a first subset of a common or public pool of shared computing and storage resources that is allocated, provisioned, or otherwise designated for utilization by the customer over a customer network. In certain instances, this arrangement may be referred to as a customer-managed VPC that is accessible over a customer VPN. Similarly, service provider computing resources 104 may be a second subset of a common or public pool of shared computing and storage resources that is allocated, provisioned, or otherwise designated for utilization by the customer over a customer network. In certain instances, this arrangement may be referred to as a service provider managed VPC that is accessible over a service provider VPN. Service provider control resources 106 may be a third subset of a common or public pool of shared computing and storage resources that is allocated, provisioned, or otherwise designated for utilization by the customer over the same customer network used to access the service provider computing resources 104. In certain instances, this arrangement may be referred to as a service provider-managed control VPC that is accessible over the service provider VPN.

Within the customer-managed network, subnet, or domain, certain resources may be stored in data storage resources that are not provided any public-facing network interface. In an embodiment, the data storage resources are not accessible to computing resources, devices, or endpoints that are not within the customer-managed network, subnet, or domain. These resources may only be accessible via one or more particular endpoints or resources within the customer-managed network, subnet, or domain.

As an example, referring to FIG. 1, customer storage resources 108 may comprise storage resources that are allocated, provisioned, or otherwise designated to the customer-managed computing resources 102. The resources 102 can be viewed as a VPC in the context of the present example. However, customer data 120 may include sensitive customer data, and customer storage resources 108 may therefore not be provided a public-facing, or any external network gateway or interface at all. In such an embodiment, there may only be certain customer-designated endpoints within the customer-managed VPC or computing resources 102 that are provided an access interface to the customer data 120.

In the example illustrated in FIG. 1, customer computing resources 102 include one or more customer endpoints, such as customer endpoint 110A and customer endpoint 110B. The one or more customer endpoints may be customer-designated endpoint which are granted access privileges and an access interface to the customer data 120 on customer storage resources 108.

Particular storage resources of customer-managed resources 102, such as those used to maintain customer data 120, may be accessible only via requests to designated endpoints that are provided an interface with the particular storage resources. Customer endpoints 110A, 110B may generally represent the access capabilities of the customer-designated endpoints that are provided an interface with customer storage resources 108. In some instances, customer endpoints 110A, 110B may be referred to as "instances" that execute on customer resources 102. It should be appreciated that these expressions are generally used to describe the customer-designated endpoints given access permissions to the particular storage resources 108 that store customer data 120, and as such may sometimes be represented or referred to in the form of an application instance running on such customer-designated endpoints, that services the access requests.

In certain embodiments, the customer endpoints 110A, 110B may apply identity-based access control to requests for customer data 120. A customer endpoint 110A, 110B may consult an ACL or any other formatted data structure assigning positive and/or negative access privileges to various users. In accordance with the ACL or any other suitable form of identity-based access control, the customer endpoint 110A, 110B may be programmed or configured to determine whether or not a request for customer data 120 is valid. In some embodiments, the customer endpoint 110A, 110B may request or retrieve customer data 120 from customer storage resources 108 only if it determines that the request is a valid request.

In embodiments where service provider application instances execute on service provider computing resources 104, the service provider application instances may require access to customer data 120, but are not co-located or co-resident with the customer endpoints 110A, 110B within the customer computing resources 102. As discussed in further detail below, the service provider application instances may send requests to the customer computing resources 102. The requests may be routed to customer endpoints 110A, 110B which process the request, access the requested portions of customer data 120, and cause the customer computing resources 102 to send the requested data back to the service provider application instances.

Even in embodiments where service provider application instances execute on the customer computing resources 102 and/or within a customer-managed network, subnet, or domain, the service provider application instances may not be provided the address of, any addressing/accessing interface to, or access privileges to the customer data 120. As such, the service provider application instances are unable to directly access customer data 120. Instead, requests for customer data 120 must still be routed through the customer endpoints 110A, 110B.

In the embodiment illustrated in FIG. 1, customer computing resources 102 is peered with service provider-managed computing resources 104 over a secured communications channel 150A. The secured communications channel 150A may be a means by which the customer network and the service provider network are communicatively coupled. In an embodiment, the customer computing resources 102 and the service provider computing resources 104 each comprise a VPC, and the secured communications channel 150A is a VPC peering connection. Optionally, secured communications channel 150A may include customer-revocable access controls 160A. Revocable access controls 160A broadly represents access controls that the customer may use to manage access to or communications with customer computing resources 102 by the service provider computing resources 104, such as access control lists, credential verification mechanisms, encryption, peering permissions, etc.

In FIG. 1, customer computing resources 102 and service provider computing resources 104 comprise gateways and/or network interfaces 140A, 140B, respectively. The gateways and/or network interfaces 140A, 140B may be configured to enable the secured communications channel 150A between the customer computing resources 102 and the service provider computing resources 104.

For example, assume the customer computing resources 102 and the service provider computing resources 104 each comprise a VPC. The gateways and/or network interfaces 140A, 140B may include one or more Network Address Translation (NAT) gateways, one or more NAT instances, and/or an Elastic Network Interface (ENI). The ENI may be configured to receive data sent from the other computing resources and forward the request to the NAT gateways and/or NAT instances. The NAT gateways and/or instances may be configured with network address information for particular computing resources, such as application instances 170A-N or customer endpoints 110A, 110B, and route requests to the appropriate computing resource. Additionally, the customer computing resources 102 may comprise a traffic flow or transit VPC that receives requests, such as information 130, from user computing devices 122 and routes the requests to the appropriate computing resources, instances, gateways, and/or network interfaces for further processing and/or handling of the request.

One or more service provider application instances may execute on service provider computing resources 104. In the example illustrated in FIG. 1, service provider application instances 170A, 170B, 170C, through 170N, also referred to herein as service provider application instances 170A-N, are executing on service provider computing resources 104.

In other embodiments, a service provider application may be provided to the customer for execution on customer-managed computing resources 102. In embodiments where one or more of the application instances 170A-N execute on the customer-managed computing resource 102, the need for a secured communications channel 150A may be eliminated, as both the service provider application instances 170A-N and the customer endpoints 110A, 110B would be within the customer-managed network, subnet, or domain. Requests can be conveyed between the service provider application instances and the customer endpoints 110A, 110B, for example, by the gateway and/or network interfaces 140A.

The service provider application instances 170A-N may each be an instance of a different service provider application, redundant instances of the same service provider application, or a combination thereof. While N instances are shown, any number may be provided in different embodiments. Additionally, for the purpose of explanation, reference is made to application instances 170A-N. However, the techniques described herein may be applied to one or more particular application instances of a set of application instances, and are not limited to the entire set of application instances executing on a computing resource. A service provider application may be any software application that provides a set of software functions to an end user. Example service provider applications include SCM systems, continuous integration (CI) management systems, deployment tracking systems, feedback systems, issue tracking systems, etc.

Generally, the user computing devices 122 have access to the customer network and the customer computing resources 102, and may interact with, send requests or other information to, or otherwise utilize service provider application instances 170A-N via the customer-managed computing resources 102. As described in further detail below, the customer computing resources 102 may receive requests targeting the service provider application instances 170A-N, forward or route the requests to the service provider application instances 170A-N, and send the results of the requests back to the user computing device 122.

Communication between co-located or co-resident application instances may occur through internal network communication protocols characteristic of local access and communication within a common network or subnet. As an example, if an source code management system, a continuous integration management system, a deployment tracking system, and an issue tracking system are executing as instances 170A-N on service provider computing resources 104, communications between these systems or application instances may occur within a common network, addressed using a virtual addressing scheme and appropriate communication constructs such as a virtual LAN. This approach may reduce or eliminate the need for any external network interfacing or address translation for communications between these interrelated systems. Similar improvements in reduced networking overhead may be conferred to communications between any subset of co-located instances 170A-N executing on customer-managed computing resources 102.

In FIG. 1, service provider-managed computing resources 104 is also communicatively coupled with service provider control resources 106. In some embodiments, service provider computing resources 104 and service provider control resources 106 may be co-located within a service provider network or subnet. In other embodiments, service provider computing resources 104 and service provider control resources 106 may be located within different networks or subnets. For example, service provider computing resources 104 may be within a service provider-managed network or subnet that has been defined, allocated, or otherwise logically separated for use in communicating with customer computing resources 102. Service provider-managed computing resources 104 and control resources 106 may be peered, or communicatively coupled, by means of a secured communications channel 150B.

The service provider control resources 106 may execute one or more control application instances for monitoring service provider application instances 170A-N. Additionally, a control application instance may periodically provide administrative controls, such as a "stop" command, a "restart" command, and/or a "fail-over" command, to a service provider application instance in response to monitored conditions.

For example, a control application instance may monitor the health of service provider application instance 170A and, in response to detecting operational issues with service provider application instance 170A, issue commands to migrate any pending operations of service provider application instance 170A to a redundant or second application instance, such as service provider application instances 170B or 170C, and halt execution of service provider application instance 170A. The control application instance may also check for updates to the service provider application instance and provide available updates to the service provider application instance. Thus, a customer is able to interact with the service provider application instance to utilize the service provider application and manage the service provider application instances' ability to communicate with customer-managed computing resources, but the customer is not required to monitor, administrate, update or otherwise maintain service provider application instances.

3.0 DATA FLOW PATHS FOR CUSTOMER AND SERVICE PROVIDER COMMUNICATIONS

Figure 2:
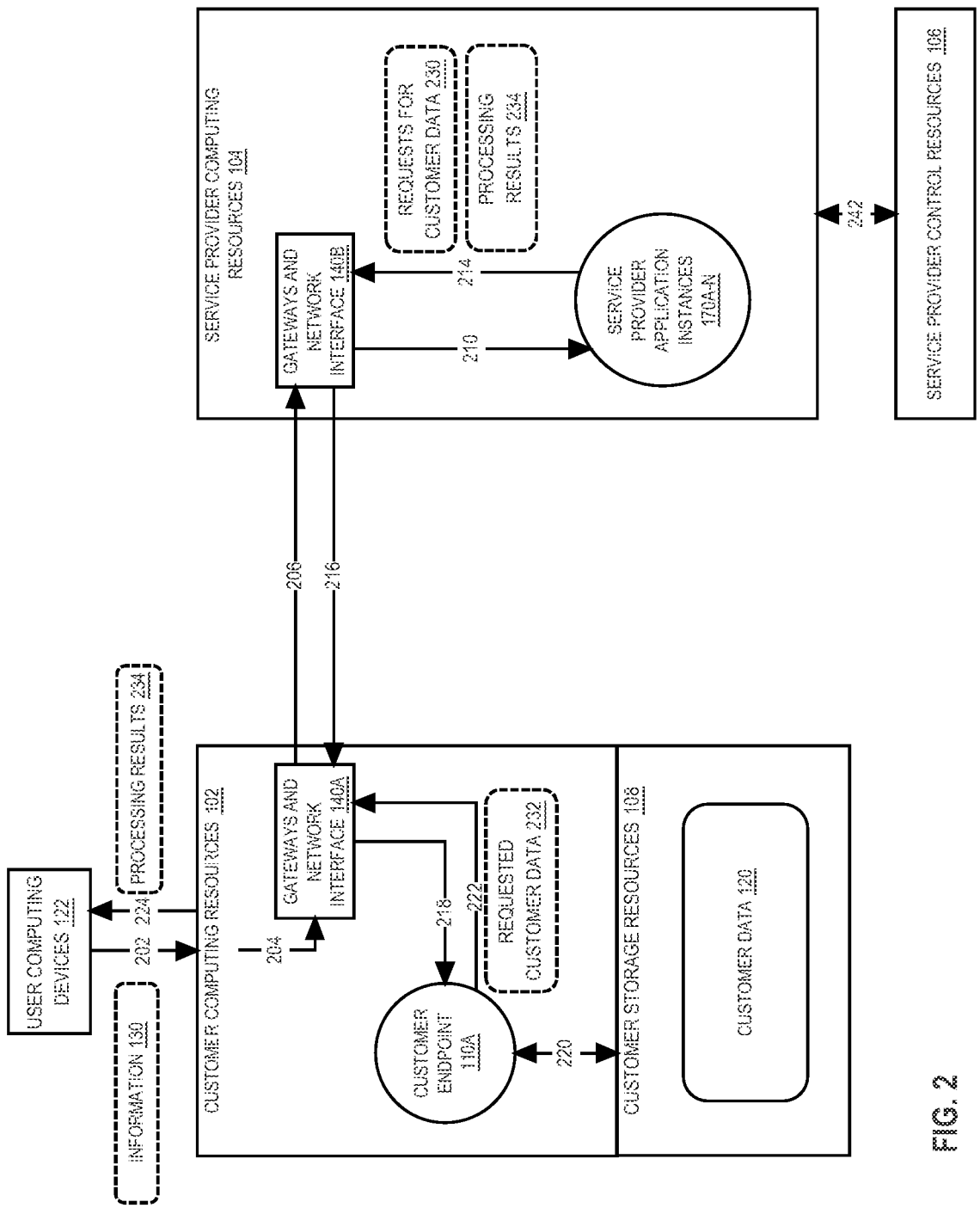
FIG. 2 illustrates data flows for processing requests of an entity to a service provider application instance within an example network environment, according to some aspects of the present disclosure.

FIG. 2 illustrates example data flows within the example network environment described by FIG. 1. Specifically, FIG. 2 illustrates data flow paths taken by an example method for processing customer requests to a service provider application instance, according to some aspects of the present disclosure.

Two directions of data flow are graphically depicted in FIG. 2. Data flowing to the right, as shown for example, by data flow segments 202, 204, 206, 208, 210, and 222 may represent data that is conveyed by the customer to the service provider. Data conveyed by the customer to the service provider may include, but is not limited to information 130 containing requests for or interactions with service provider applications, requested portions of customer data 232, or any other customer information that is used by and/or provided to the service provider application instances 170A-N.

Data flowing to the left, as shown for example, by data flow segments 214, 216, 218, 220, and 222 may represent data that is conveyed by the service provider to the customer. Data conveyed by the service provider to the customer may include, but is not limited to: requests 230 for portions of customer data 120 that are generated by application instances 170A-N responsive to processing customer information 130, and processing results 234 that are generated by the application instances 270 completing the processing of customer information 130 based on the requested customer data 232.

In FIG. 2, data flow between the customer and the service provider may originate at user computing devices 122 with interaction information, such as information 130, from a user being sent from client devices 122 to the customer-managed computing resources 102. As discussed above, the interaction information may comprise a request for services provided by service provider application instances 170A-N. Data conveyed on path segment 202 may represent the flow of any data between user computing devices 122 and the customer computing resources 102. Path segment 202 is shown as originating at user computing devices 122 and terminating at customer computing resources 102, for the sake of compactly explaining salient features of the present disclosure. In general, path segment 202 may represent a data flow path to any computing or storage resource within resources 102, or application instance executing thereon, that can convey data over path segment 204 to the gateways and/or network interfaces 140A.

Path segment 204 may refer to a path between a computing resource within customer-managed computing resources 102 that receives the information 130 from the user computing devices 122 and the gateways and/or network interfaces 140A. In certain instances, such as when resources 102 are a customer-managed VPC accessed via a customer VPN, the information 130 may be received by a traffic flow or transit VPC, which routes the information 130 to the gateways and/or network interfaces 140A in customer computing resources 102.

Path segment 206 may represent data that is sent from the gateways and/or network interfaces of gateways and/or network interfaces 140A at customer computing resources 102, via a customer network, to service provider-managed computing and storage resources 104, and is received at the gateways and/or network interfaces 140B at service provider-managed computing and storage resources 104, via a service provider network.

Path segment 210 may represent data that is sent from the gateways and/or network interfaces 140B to the service provider application instances 170A-N for processing.

Responsive to different types of user requests provided to the application instances 170A-N, requests 230 for customer data 120 and/or completed processing results 234 may be generated by the service provider application instances 170A-N. Requests 230 for customer data 120 may be generated when particular customer data 120 are required to complete processing of particular requests for services from the customer. Processing results 234 may be generated after receiving the requested customer data 232 at the application instances 170A-N. In FIG. 2, path segment 214 may represent data conveyed from the application instances 170A-N to the gateways and/or network interfaces 140B.

Path segment 216 may represent data that is sent from the gateways and/or network interfaces 140B at service provider computing resources 104, via a service provider network, to the customer computing resources 102, and is received by the gateways and/or network interfaces 140A at customer computing resources 102, via a customer network.

Path segment 218 may represent data that is conveyed by the gateways and/or network interfaces 140A to computing resources within the customer computing resources 102. Specifically, in FIG. 2, path segment 218 represents data that is conveyed to customer endpoint 110A.

Path segment 220 may represent data that is exchanged between the customer computing resources 102, such as customer endpoint 110A, with the customer storage resources 108 that are used to store the customer data 120. The exchanged data may be, for example, the requisite information exchanges required for the fulfillment of a request 230 for customer data 120 or a portion thereof, to produce requested customer data 232.

Path segment 222 may represent data that is conveyed back to the gateways and/or network interfaces 140A from the customer endpoint 110A, such as the requested customer data 232.

The requested customer data 232 may be conveyed back to the service provider application instances 170A-N via path segments 206 and 210 as discussed above. Similarly, processing results 234 may be conveyed back to the customer computing resources 102 via path segments 214 and 216 discussed above. The processing results 234 may be conveyed over path 224 back to the client devices 122, after being received at the customer computing resources 102.

Additionally, FIG. 2 illustrates path segments 242 between service provider computing resources 104 and service provider control resources 106. Path segments 242 may represent data that is conveyed from service provider control resources 106 to the service provider computing resources 104. Additionally, path segments 242 may represent data communication pathways used by the service provider control resources 106 to monitor the health of application instances 170A-N executing on the service provider resources 104. Available updates, and administrative controls may also be provided over path segments 242. Examples of administrative controls include "stop," "restart," and "fail-over" commands.

3.1 Interacting with Service Provider Application Instances

Figure 3:
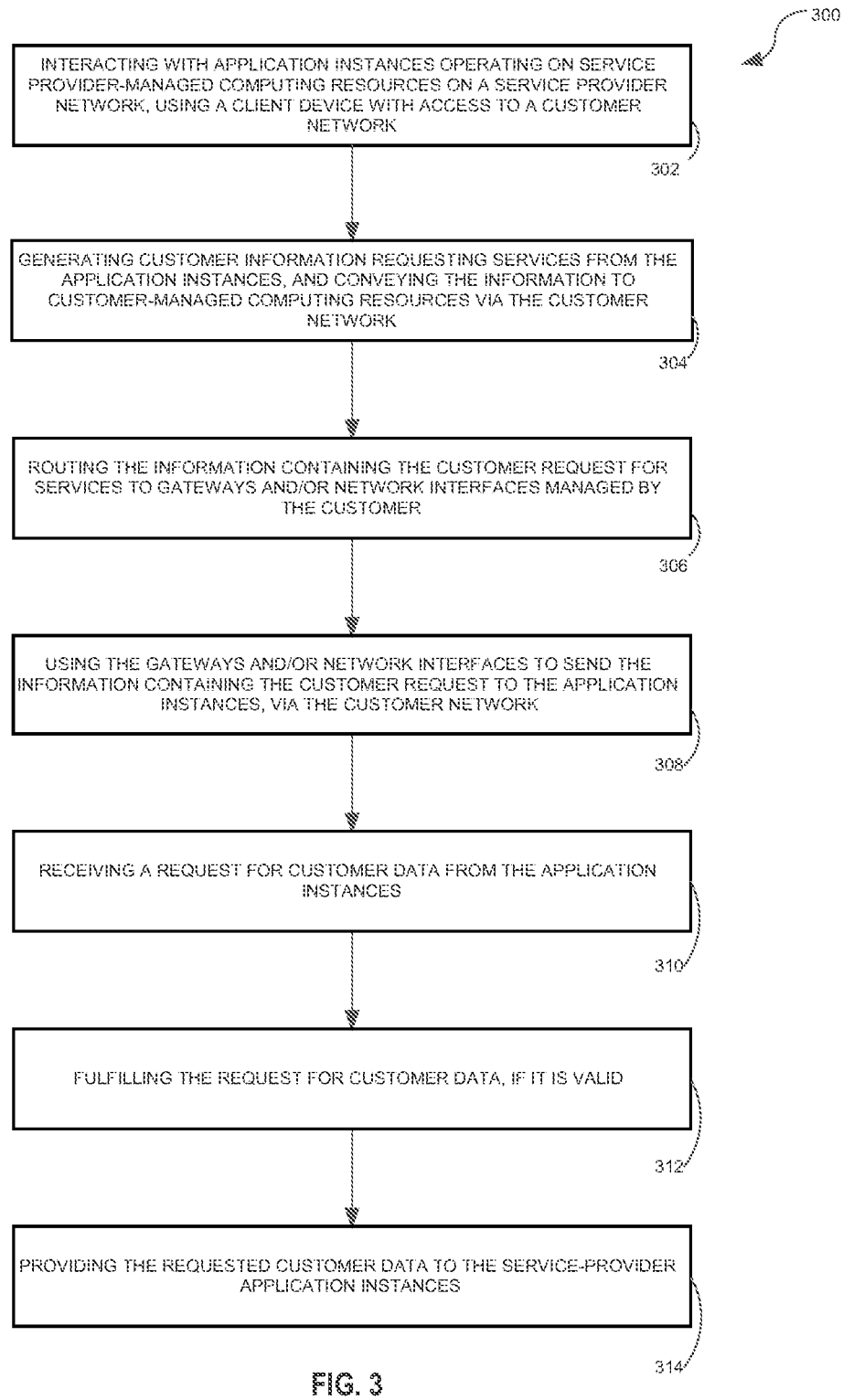
FIG. 3 illustrates an example method for interacting with and sending requests to a service provider application instance, according to some aspects of the present disclosure.

FIG. 3 is a flowchart illustrating example steps for interacting with and sending requests to a service provider application instance, according to some aspects of the present disclosure. In FIG. 3, a method 300 comprises steps for a customer that stores customer data 120 on customer-managed storage resources 108 to request services provided by service provider application instances 170A-N.

At step 302, a user of a user computing device 122 may interact with a service provider application. As discussed above, the user may interact with the service provider application via a graphical user interface, web browser, etc. executing on the user computing device 122. The service provider application instance may be operating on service provider-managed computing resources within a service provider network. The user computing device 122 may have access to a customer network, which is used to convey information between the user computing device 122 and service provider computing resources 104.

At step 304, user computing device 122 may generate customer information 130 for requesting services from the application instances. The information 130 may include, for example, digital data indicating one or more commands, requests, queries, or other user interaction or user input information, based on the user interaction at step 302. Additionally, information 130 may include digital data comprising customer data, such as newly provided customer data, modifications to existing customer data, indications of customer data to be deleted, etc., and/or digital data referencing customer data, such as links or other references to particular portions of data. This information 130 may then be conveyed to customer-managed computing resources 102 via the customer network, for example, along data path segment 202 described above in connection with FIG. 2.

At step 306, the information 130 containing the customer request for services may be routed within the service provider network or service provider computing resources to network or computing resources that can send the information 130 to an external and/or peered destination. As an example, information 130 may be routed to gateways and/or network interfaces 140A along data path 204 of FIG. 2.

At step 308, the gateways and/or network interfaces 140A may be used to send the information 130 containing the customer request to the application instances 170A-N, for example along data path segment 206 of FIG. 2.

At step 310, the customer computing resources receive a request for customer data from a service provider application instance. For example, customer computing resources 102 may receive a request 230 for customer data from the application instances 170A-N executing on service provider computing resources 104, for example along data path segments 216. The request may be received via a public-facing network interface provided by gateways and/or network interfaces 140A. In embodiments where the gateways and/or network interfaces 140A include NAT gateways and an ENI, the information 130 may be received at the ENI in gateways and/or network interfaces 140A, and then routed to a NAT gateway in gateways and/or network interfaces 140A.

At step 312, the customer-managed computing resources 102 may fulfill the request for customer data. In some embodiments, fulfilling the request for customer data may comprise sending or routing the request to one of the more customer endpoints 110A or 110B, which accesses the customer data 120 and retrieves requested customer data 232. The customer endpoints 110A or 110B may package the requested customer data 232 for delivery to the service provider application instance, and send or forward the requested customer data 232 to the gateways and/or network interfaces 140A, for example by path segment 222 illustrated in FIG. 2.

In an embodiment, fulfilling the request for customer data comprises validating the request for customer data, and fulfilling the request in response to determining that the request is valid. Validity of the data request can be assessed by consulting an access control list (ACL) or any other suitable method of identity-based access restriction. In an embodiment, consultation of the ACL or other access validation techniques may be performed by either of the customer endpoints 110A and 110B. The customer endpoint 110A and 110B may determine if the request is valid, by consulting an ACL or any other suitable method of verifying that the request is valid or made by a requestor with sufficient permissions to access the requested customer data 120.

At step 314, the customer-managed computing resources 102 may provide the requested customer data to the service provider application instances 270. In an embodiment, the requested customer data is sent to the service provider computing resources 104 using the gateway and/or network interfaces 140A, for example via data path segment 206.

3.2 Accessing Customer Data from Service Provider Application Instances

Figure 4:
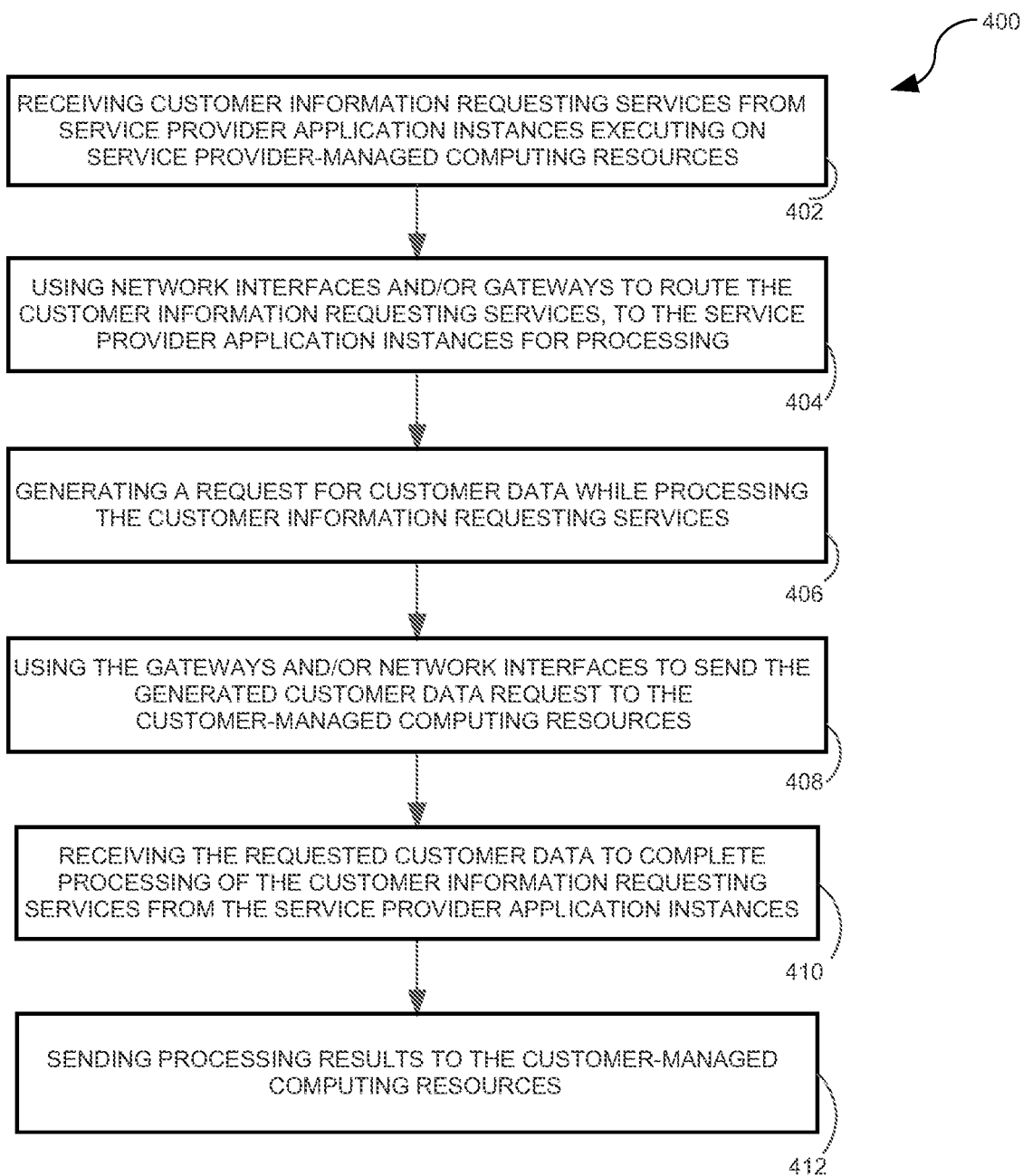
FIG. 4 illustrates an example method for processing interactions and requests using a service provider application instance, according to some aspects of the present disclosure.

FIG. 4 is a flowchart illustrating example steps for processing customer interactions and requests using a service provider application instance, according to some aspects of the present disclosure. The service provider method 400 of FIG. 4, discussed above in terms of the overall data flow between service provider computing resources that provide access to service provider application instances 170A-N to a customer and generates requests for customer data 120 that reside on customer storage resources 108 in connection with the graphical illustrations of FIGS. 1 and 2, is now considered.

At step 402, service provider computing resources may receive information from customer computing resources. For example, service provider computing resources 104 may receive information 130 from customer computing resources 102. The information 130 may comprise a request for services from the service provider application instances 170A-N executing on service provider computing resources 104 in a service provider network. In embodiments where service provider computing resources 104 comprise a service provider-managed VPC accessible by a VPN, the gateways in gateways and/or network interfaces 140B may include one or more Network Address Translation (NAT) gateways, and the network interfaces in gateways and/or network interfaces 140B may include an Elastic Network Interface (ENI). The gateways and/or network interfaces 140B may generally provide a public-facing network interface that can be used to receive the information 130 sent by the customer-managed resources 102, by secured communications channel 150A. The information 130 may be received via the public-facing network interface provided by gateways and/or network interfaces 140B. In embodiments where the gateways and/or network interfaces 140B include NAT gateways and an ENI, the information 130 may be received at the ENI in gateways and/or network interfaces 140B, and then routed to a NAT gateway in gateways and/or network interfaces 140B.

At step 404, gateways and/or network interfaces 140B may be used to route the customer information 130, requesting services from the service provider application instances 170A-N, to the service provider application instances 170A-N for processing, for example via path segment 210 illustrated in FIG. 2. As an example, a NAT gateway in gateways and/or network interfaces 140B may route the information 130 to service provider application instances 170A-N.

Additionally, the gateways and/or network interfaces 140B may determine one or more particular service provider application instances of the service provider application instances 170A-N to which to route the customer information 130. For example, if a request is for a SCM system, then the customer information 130 may be routed to a particular service provider application instance that is an instance of the SCM system.

At step 406, based on the customer information 130, the service provider application instance may generate a request for customer data that is needed for processing a request or command contained in information 130. For example, the service provider application instances 170A-N may generate a request 230 for customer data while processing the customer information 130. The service provider application instances 170A-N may send or forward the request 230 to gateways and/or network interfaces 140B, for example via path segment 214 illustrated in FIG. 2.

At step 408, the service provider computing resources send the request for customer data to the customer computing resources. In an embodiment, the gateways and/or network interfaces 140B may be used to send the generated customer data request 230 to the customer computing resources 102, for example via path segment 216.

At step 410, the service provider computing resources receive the requested customer data and send the requested customer data to the service provider application instances 170A-N that initiated the request. The service provider application instances 170A-N may receive the requested customer data 232 and complete processing of the customer information 130 based on the requested customer data 232. In an embodiment, based on processing the customer information 130, the service provider application instances 170A-N generates processing results 234.

At step 412, the service provider application instance causes the processing results to be sent to user computing device that originally sent the request 130. For example, service provider application instances 170A-N may send processing results 234 to customer computing resources 102 according to similar means described above in connection with steps 406 and 408. The customer computing resources 102 may send the processing results 234 back to the user computing device 122, for example, via data flow segment 224.

Although examples and steps are described herein for requesting to customer data, the techniques described herein are not limited to requesting access to customer data. For example, the above steps may be used to modify existing customer data, delete or move existing customer data, or store new or additional customer data in the customer storage resources. The requested data sent back to the service provider application instance may be an indication of whether the request to modify/remove/add data was successful, and/or an indication of the modified/removed/added data.

4.0 EXAMPLES OF INTERRELATION BETWEEN APPLICATION INSTANCES

Above, in connection with FIG. 1, certain examples were provided for the application systems that may execute as service provider application instances 170A-N on computing resources managed by service provider computing resources 104 or on computing resources 102 managed by a customer. In an embodiment, the application instances 170A-N depicted in FIG. 1 and FIG. 2 may also communicate with each other to perform application functions. For example, the application instances may be configured to update source code, deploy source code updates, track these deployments and render dashboards displaying information about deployments of interest to users, and each application instance may be responsible for providing a respective one of the above functions.

An SCM system typically stores source code repositories and manages their content. It also receives or responds to requests from user computing devices 122 and the CI management system, which may execute as another one of application instances 170A-N to retrieve or store data in the repositories. For example, the SCM system may notify the CI management system when a user updates source code in a repository. In addition, the SCM system may receive a request from the CI management system to access source code from a repository that has recently been updated. The SCM system, in response, may retrieve the requested source code and forward it to the CI management system.

To clarify, as described above in connection with the foregoing aspects of the present invention, rather than storing actual sensitive customer data such as source code within the data structures or data repositories persisted by the various application systems or otherwise managed by the service provider computing resources, customer data relied upon by an application system that executes as one of the application instances 170A-N, may be "stored" in the service provider-managed computing resources, including in memory, as callback links or other reference links that refer to, or otherwise trigger a request for customer data. The customer data is, instead, located at a particular location in the customer-managed storage resources, such as customer storage resources 108 that store customer data 120.

In the example given above in connection with the operation of a SCM system, rather than storing any customer source code in storage resource managed by the service provider, the application instances 170A-N that implement the aforementioned systems may instead store any and all sensitive source code or other customer data 120 within storage resources managed by the customer. The service provider-managed storage or computing resources may then reference a link back to the particular location within customer-managed storage resources at which the relevant customer information is maintained. In this way, users on a service provider network have no access to customer data 120, as this data is stored on resources that are not accessible outside the isolated network or subnet on which the customer computing resources 102 have been provisioned or otherwise designated for utilization and control by the customer.

As another example, a CI management system manages builds and deployments. Specifically, the CI management system may be a system that detects whether source code in a repository that is registered for continuous integration is updated, retrieves the corresponding deployment descriptor from the repository, initializes one or more containers to retrieve the updated source code from the repository, and deploys the updated source code based on the deployment descriptor.

To deploy source code in various environments, the CI management system utilizes one or more computing resources. In some embodiments, the CI management system communicates with a container management system to provision one or more computing resources to perform the build. Examples of container management systems include DOCKER, Amazon Web Services EC2 Container Services, and Google Kubernetes.

As described above, the CI management system may not store actual data related to build and deployment information, such as source code, deployment descriptors, etc. Rather, an instance of the CI management system may utilize links or other references that refer to, or otherwise trigger a request for, the necessary data, which is located at a particular location in the customer storage resources. An example is customer storage resources 108 storing customer data 120.

Other example application systems which may request and utilize customer data include feedback systems, deployment tracking systems, and issue tracking systems. Instances of these application systems may access, modify, add, or remove customer data using the techniques discussed above. Additionally, accessing, modifying, adding, or removing customer data may further comprise communication between application instances, for example, to request additional data or processing functions provided by other application instances.

A feedback system may be a system that receives notifications such as build updates and test results from the CI management system and communicates/displays these notifications to developers and other interested parties, such as project managers, IT support, etc. The notifications may be communicated to the interested parties via any known communication means such as email, SMS, instant message. Alternatively, the notifications are made accessible on a web server, which the interested parties can access through web browsers on their client devices.

A deployment tracking system may be a system that receives/retrieves information related to source code deployments from the CI management system and stores this information in a database. Further, it is configured to forward this information to user computing devices 122 as and when deployment information is requested by developers and other interested parties, such as project managers, IT support, etc. The information may be communicated to the interested parties via any known communication means such as email, SMS, instant message. Alternatively, the information is made accessible on a web server, which the interested parties can access through dedicated clients or web browsers on their user computing devices 122.

The issue tracking system (ITS) manages work items or "issues." Example ITSs include Jira and Jira Service Desk, which are commercially available from Atlassian. When implemented in a software development scenario, the work items managed by the ITS may be bugs, fixes, current software features under development, and/or features intended for further development. Accordingly, users may utilize the ITS to identify one or more bugs in a particular source code revision, recommend possible solutions to identified bugs, recommend features for new versions of a source code, etc.

In order to create and progress issues in the ITS, users interact with user interfaces provided by an ITS client. For example, a user may create a new issue and provide relevant information in respect of the issue, such as the unique identifier of the source code revision the issue is associated with, a description of the issue, a priority, and any other relevant information. The ITS itself typically generates an issue key that can be used to uniquely identify the issue, which may be hidden from or visible to the user. Once an issue has been created, a user can interact with it, for example by adding additional information to the issue in an issue description or other field, changing the state of the issue or assigning the issue to another person. Examples of state values include IN PROGRESS and RESOLVED; examples of issue assignment include changing an assigned person field.

In certain embodiments, the deployment tracking system is configured to communicate with the ITS to retrieve issues related to the source code deployments managed by the CI management system. Thereafter, the deployment tracking system may store this information in the customer-managed storage resources 108 at which customer data 120 is stored, and/or communicate as a summary of issues along with deployment summary for display on a client device 122. Internal to the persisted data structures maintained or managed by the service provider at storage or computing resources 104, links or other references to locations within customer-managed storage resources where sensitive customer information is stored may be provided, rather than the actual customer data 120 itself, which resides on customer-managed computing and storage resources 102.

In the above descriptions, the SCM system, CI management system, deployment tracking system, feedback system, and ITS have been described as separate systems communicating over one or more internal or external networks/subnets. These systems or their functionality may, however, be divided over any number of physical systems communicating in any appropriate manner. By way of example, the functionality of the CI management system and the tracking system may be combined and hosted as a single system.

Although only one user computing device 122 has been discussed in the examples above, normal operation of an SCM system typically involves many more client devices communicatively coupled to the SCM system to access data from, and write data to, repositories that are organized by the SCM system.

The user computing devices 122 may communicate with the other systems in environment 100 via suitable communication networks. For example, the client devices 122 may communicate with the SCM system via private or public networks, with the CI management system and the feedback system via public networks. It will be appreciated that based on the required implementation, any suitable communication network may be utilized to allow communication between the systems in environment 100.

5.0 EXAMPLE INTERACTIONS WITH SERVICE PROVIDER APPLICATIONS

Application instances implementing the aforementioned examples of interrelated database management applications, whether executing on computing resources 102 that are managed by the customer or computing resources 104 that are managed by the service provider, may receive customer requests and additional information related to the customer requests from a customer user operating a client device 122, generally referred to above as information 130. The customer requests may be received as unencrypted or encrypted customer data that may be decrypted during processing of the request.

As mentioned above in the section entitled "Examples of Interrelation Between Application Instances," various application systems, executing as application instances 170A-N, may forego storing copies of sensitive customer data 120, such as source code or other customer data relied upon by the application system within data structures or other data repositories managed by the various application systems. Instead, what may be "stored" or utilized by the application instances are callback links or other reference links that reference, or otherwise facilitate the generation of a request for, the required customer data within customer-manage storage resources. As an example, the callback link may specify a particular location in the customer-managed storage resource 108, or identify a particular portion of customer data 120 where desired or required customer data resides. Ensuring that no actual customer data 120 is stored or persisted in service provider-managed resources such as resources 104, or in other words, ensuring that customer data 120 resides exclusively at customer-managed resources such as resources 102, 108, may be especially critical when the application instances 170A-N execute on service provider-managed resources such as resources 104, for ensuring security of the customer data.

As described earlier, an SCM system may not store any customer source code in maintained repositories, but may instead populate a repository data structure with callback or other reference links to particular locations in customer data 120 where the relevant source code is stored on customer-managed resources 102. In the example given above in connection with the operation of a SCM system, rather than storing any customer source code in storage resource managed by the service provider, the application instances 170A-N that implement the aforementioned systems may instead store any and all sensitive source code or other customer data 120 within storage resources managed by the customer.

In this way, users on a service provider network have no access to customer data 120, as this data is stored on resources that are not accessible through the isolated network or subnet on which the service provider-managed computing resources 104 have been provisioned or otherwise designated for utilization and control by the service provider. Instead, the data 120 is accessible only via customer-designated endpoints authorized to access the customer data 120 via the private customer network or subnet associated with the customer-managed computing resources 102 on which the customer data 120 is persisted.

Access to the customer data 120 may be requested automatically in connection with routine processing steps performed by one or more of the instances 170A-N. However, in some instances, such as in the methods 300 and 400 of FIGS. 3 and 4, customer data may be requested responsive to processing information, such as information 130, that contains customer requests for application services.

When application instances 170A-N comprise a SCM and a CI management system, to differentiate the repositories registered for CI from the rest of the repositories, in one embodiment, each of the repositories may have associated metadata that includes an indicator indicating whether CI is enabled or not. The metadata of CI enabled repositories may also include build configuration files, which include, among other things, the steps for performing a build, and identifiers of one or more predefined tasks. The CI management system may be configured to determine whether CI is required for a repository by inspecting the CI indicator in the metadata and, if such an indicator is present, retrieve the associated build configuration file. Changes to the indicator metadata of repositories, indicating whether CI is enabled or not may be an example of a customer interaction that when processed, causes a request for customer data to be generated by the application instances 170A-N.

The user computing devices 122 may be configured to communicate with the SCM system, the CI management system, and the feedback system, when these applications execute as instances 170A-N. To that end, in certain embodiments, the user computing devices 122 include various installed applications such as an SCM client, a CI client or a web browser.

The SCM client may be configured to create local working copies of source code, while maintaining the customer-managed residency of the customer data 120; modify the working copies; commit/push changes made in the working copies to the customer-managed storage resources that maintain the customer data 120, where a primary working copy of the customer source code may maintain residency so that the changes are written to the relevant repository stored in customer data 120; fetch or pull files from a repository the developer has access to, such as the customer source code repositories contained in customer data 120; provide a user interface for reading or writing source code and build instructions. While providing these functions to a user of client device 122, the user interactions with the SCM client may generate requests for services along with additional accompanying information that may be sent to application instances 170A-N via the data flow described by steps 304, 306, 308, 402, 404 as information 130 for processing.

The CI client may be configured to allow communication between the client device 122 and the CI management system application instances 170A-N. For example, it may allow a developer to register an SCM repository stored within customer data 120 for CI with the CI management system, and create or edit the build configuration file for the SCM repository. In order to aid in creating the build configuration file, the CI client may present a list of predefined tasks, such as presenting the names or short descriptions of available predefined tasks. The developer may select tasks to add into their build configuration. In certain embodiments, the predefined tasks may be classified under categories such as deployments or notifications. When a developer selects a particular task for adding into their configuration file, the CI client may further prompt the developer to provide any run parameters required to eventually execute the task. For example, the parameters may be for credentials of any third party accounts the system has to access in order to execute the task.

In certain embodiments, the CI client may also be utilized to create user defined tasks. For example, a user may utilize the CI client to define a task by providing a task name, a task description, a base virtual machine (VM) image for the task, any run parameters required to execute the task, and the script commands to execute the task. When a task is created, it can be submitted to the CI management system executing as instances 170A-N, which in turn may automatically builds a VM image for the task and push the VM image for storage. In certain embodiments the VM image may be stored within customer-managed storage resources that maintain residency within customer-managed resources 102.

A URL specifying the location of the VM image within customer data 120 may be passed back to the developer and may be added as part of the task definition. Once a task is created in this manner, the task name and description may be added to the list of tasks available for other developers to select from their CI client and the entire description of the task is stored in a task definition repository.

In certain embodiments, the SCM system may communicate an event descriptor via a webhook—an HTTP POST callback that creates and passes the event descriptor to the CI management system when a corresponding repository is updated. For this to work, webhooks are created for the repositories registered for CI.

Once an event descriptor that corresponds to a repository for which CI is required is received, the CI management system retrieves the deployment descriptor for the repository. In certain embodiments, the deployment descriptor may be stored in the SCM repository along with the source code, for example, within customer data 120. Accordingly, depending on the particular embodiment, the CI management system retrieves the deployment descriptor from the corresponding SCM repository stored within customer data 120, by for example, generating a request for customer data within customer data 120 that is stored on storage resources managed by the customer, for example, within customer storage resources 108.

Generally speaking, the deployment descriptor corresponding to a particular repository includes instructions for deploying source code revisions from that repository in one or more environments. Further, in some cases, the deployment descriptor may include different sets of deployment instructions for different source code branches. For example, if a repository includes a master branch and a testing branch, the deployment descriptor may include one set of instructions for deploying source code revisions committed to the master branch and another set of instructions for deploying source code revisions committed to the testing branch.

Further still, the deployment descriptor may include a different set of instructions for deploying source code revisions that are manually selected by a developer for a custom deployment. It will be appreciated that these are merely examples and that in some cases the deployment descriptor may include a single set of instructions for deploying source code revisions committed/pushed on any branch and/or manually selected.

A set of deployment instructions may include the name of one or more repository branches for testing and steps for executing the deployment for each branch. The steps include commands for executing the deployment and settings of a container in which the source code is supposed to be deployed. A deployment configuration or descriptor may be DEFAULT when the steps for a configuration are executed for all commits, or when source code revisions pushed to the SCM system repositories maintained within customer data 120, for that repository, unless the commit is for a particular branch or is manually selected.

Examples of information 130 associated with requests for services from the instances 170A-N could be user-provided steps, which define the commands executed and settings of containers in which the source code is to be built. Each step may further include a name, which defines what the step is doing. This field is usually displayed by the tracking system 108 and therefore is usually something that developers can easily understand. A deployment configuration may also include an image, specifying the container image to be used for executing a particular step. If an image is not specified, a default image may be used. A deployment configuration may also include a trigger, whether a particular step is manual or automatic, for example, whether the CI management system should automatically run the step or wait for approval. A deployment parameter may also be included within information 130, defining the type of environment for the deployment. Examples of types of environments include testing, staging and production. Finally, the deployment configuration may include a script that contains a list of commands that are executed to perform the build and artifacts that defines files that are produced by a particular step, such as reports, clean copies of the source code, or result files that are to be shared with the next step in the build configuration. Any intermediate files produced by a particular step, to be used for the next step in the build configuration, may be stored within customer data 120 on customer-managed storage resources 102.

To retrieve data, such as the deployment descriptor and source code from the SCM repository maintained within the customer data 120, the CI management system application instances 170A-N may generate requests for desired or required customer information, using the techniques discussed above.

6.0 IMPLEMENTATION EXAMPLE—HARDWARE OVERVIEW

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
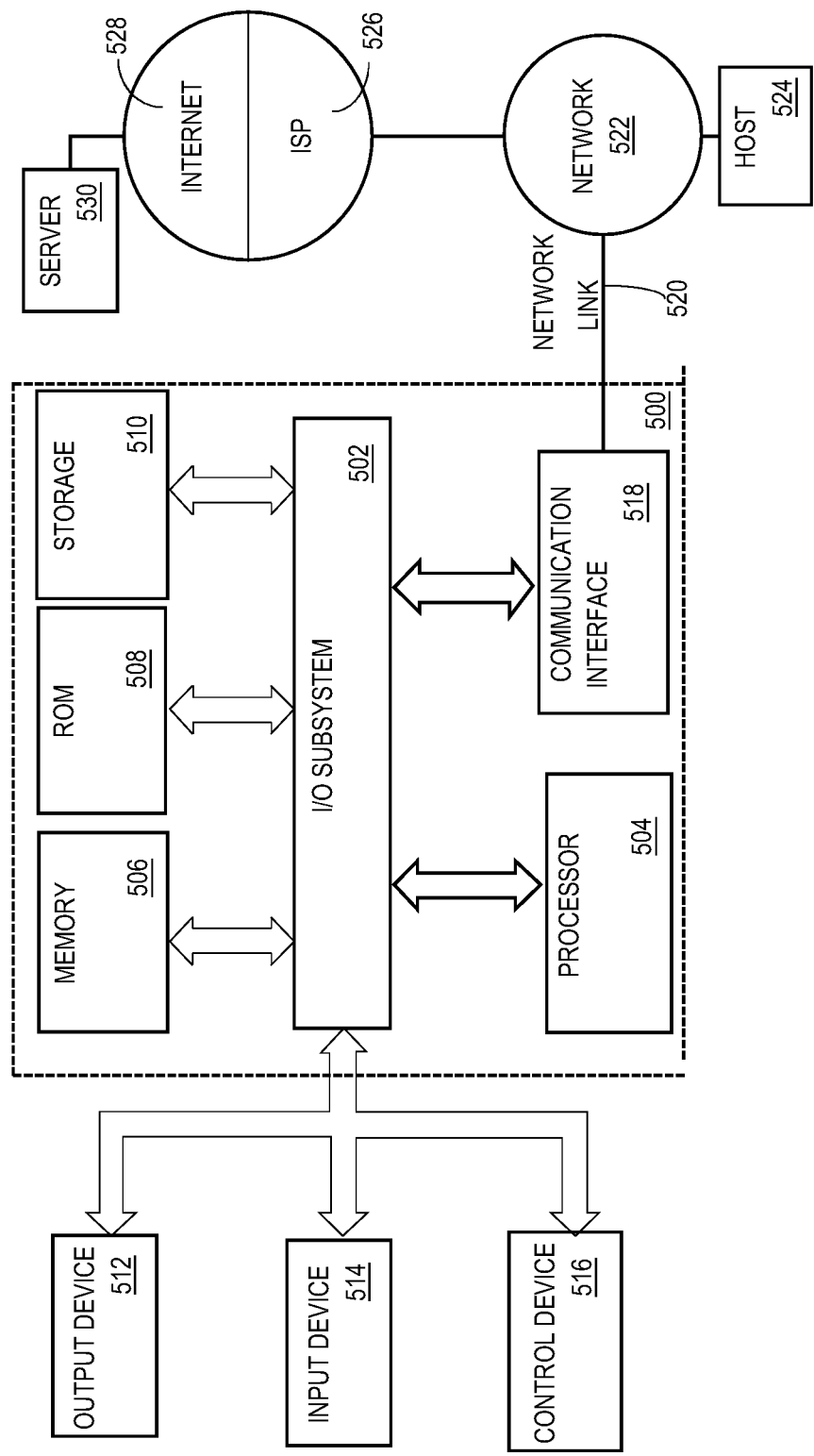
FIG. 5 illustrates a computer system, which may be used to implement various embodiments.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include one or more other types of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (such as, x) and a second axis (such as, y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to one or more network links 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the one or more networks, network links 520 and communication interfaces 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of managing customer data, the computer-implemented method comprising:
   receiving, at a service provider application instance of a service provider, a first request from a client application of a client device, the client application accessing the service provider application instance using a service provider network interface operated by the service provider, the service provider application instance being an instance of an issue tracking system configured to track issues created in response to requests generated by a set of client devices, each client device of the set of client devices operating a client application instance;
   processing the first request by the service provider application instance by:
      in accordance with the first request requiring the customer data, sending a second request, by the service provider application instance, to a customer-managed endpoint configured to provide access to a customer network operated by a customer; and
      in accordance with a verification of the second request by the customer-managed endpoint, obtain the customer data from customer computing resources of the customer network, at least a portion of issue data associated with the issues tracked by the issue tracking system is stored as the customer data on the customer computing resources; and
   providing the customer data to the client application of the client device.

2. The computer-implemented method of claim 1, wherein:
   the verification of the second request is performed by the customer-managed endpoint by:
      consulting an access control list maintained on the customer computing resources; and
      in accordance with the service provider application instance having sufficient permissions to access the customer data, granting access to the customer data.

3. The computer-implemented method of claim 1, wherein the verification of the second request by the customer-managed endpoint includes a verification of a customer-issued access credential.

4. The computer-implemented method of claim 3, wherein in accordance with the customer-issued access credential being revoked by the customer, access to the customer network via the customer-managed endpoint is refused.

5. The computer-implemented method of claim 1, wherein the customer data is communicated to the service provider application instance via a secured channel established between the customer computing resources and the service provider application instance.

6. The computer-implemented method of claim 1, wherein the service provider application instance is operated on service provider computing resources that are distinct from the customer computing resources.

7. The computer-implemented method of claim 1, wherein the client application is operated via a web browser executing on the client device.

8. The computer-implemented method of claim 1, wherein the service provider application instance is a single-tenanted application instance that only services requests from a single customer.

9. A computer-implemented method of managing customer data, the computer-implemented method comprising:
   receiving, at a service provider application instance, a first request generated in response to an action performed on a client application of a client device, the first request received by the service provider application instance via a service provider network interface operated by a service provider, the service provider application instance being an instance of an issue tracking system configured to track issues created in response to requests generated by a set of client devices, each client device of the set of client devices operating a client application instance;
   processing the first request by the service provider application instance by:
      in accordance with the first request comprising a request for the customer data, sending a second request, by the service provider application instance, to a customer network operated by a customer; and
      in accordance with a verification of the second request by a customer-managed endpoint of the customer network, obtaining the customer data from customer computing resources of the customer network, at least a portion of issue data associated with the issues tracked by the issue tracking system is stored as the customer data on the customer computing resources; and
   completing the processing of the first request, by the service provider application instance, based on the customer data.

10. The computer-implemented method of claim 9, wherein the at least the portion of the issue data stored as the customer data on the customer computing resources is not replicated within the issue tracking system.

11. The computer-implemented method of claim 9, wherein:
   the verification of the second request is performed by the customer-managed endpoint by:
      consulting an access control list maintained on the customer computing resources; and
      in accordance with the service provider application instance having sufficient permissions to access the customer data, granting access to the customer data.

12. The computer-implemented method of claim 9, wherein the verification of the second request by the customer-managed endpoint includes a verification of a customer-issued access credential.

13. The computer-implemented method of claim 9, further comprising:
   monitoring a flow of information between the service provider application instance and other entities on the customer network; and based on the monitoring of the flow of the information, regulating access privileges granted to the service provider application instance.

14. The computer-implemented method of claim 9, wherein:
the customer data is encrypted customer data; and
completing processing of the first request includes decrypting the encrypted customer data.

15. A computer-implemented method of managing customer data, the computer-implemented method comprising:
receiving, at a service provider application instance executing on first computing resources within a service provider network, a first request from a client device, the service provider application instance being an instance of an issue tracking system configured to track issues created in response to requests generated by at least the client device operating a client application instance;
processing the first request, by the service provider application instance, by:
sending, by the service provider application instance, a second request for the customer data, via the service provider network, by routing the second request from the service provider application instance to second computing resources within a customer network, the customer data residing on the second computing resources within the customer network, the customer network separate from the service provider network, at least a portion of issue data associated with the issues tracked by the issue tracking system is stored as the customer data on the second computing resources; and
receiving the customer data, via the customer network, at the service provider application instance; and
completing the processing of the first request, by the service provider application instance, based on the customer data.

16. The computer-implemented method of claim 15, wherein:
sending the second request for the customer data to the second computing resources within the customer network includes sending the second request to an endpoint within the customer network; and
the endpoint within the customer network is configured to grant access to the customer data in accordance with the service provider application instance having sufficient permissions to access the customer data.

17. The computer-implemented method of claim 15, wherein:
the first computing resources include a first virtual private cloud managed by a first party;
the second computing resources include a second virtual private cloud managed by a second party; and
the first virtual private cloud and the second virtual private cloud are communicatively coupled via a secured communications channel.

18. The computer-implemented method of claim 15, wherein:
the second request for the customer data comprises:
requesting a particular portion of the customer data;
sending the second request, via the service provider network, by accessing a callback link associated with the particular portion of the customer data; and
generating the second request based on the callback link; and
a target of the callback link is accessible only from within the customer network.

19. The computer-implemented method of claim 15, wherein both the customer network and the service provider network are operated by a customer.

\* \* \* \* \*